United States Patent [19]

Trelease et al.

[11] 3,955,005
[45] May 4, 1976

[54] RETARDATION OF OXIDATION AND MICROBIAL GROWTH IN FOODS

[75] Inventors: Richard D. Trelease, Downers Grove; Robert B. Tompkin, La Grange, both of Ill.

[73] Assignee: Swift & Company, Chicago, Ill.

[22] Filed: Nov. 14, 1973

[21] Appl. No.: 415,619

[52] U.S. Cl................................ 426/310; 426/332; 426/335; 426/532; 426/546
[51] Int. Cl.$^2$........................ A23L 3/34; A23B 4/14
[58] Field of Search........... 426/151, 181, 224, 227, 426/228, 321, 323, 326, 328, 330, 331, 332, 333, 334, 335, 310, 532, 546

[56] References Cited
UNITED STATES PATENTS
2,933,399   4/1960   Nickerson et al.................. 426/224

OTHER PUBLICATIONS

Furia, "Handbook of Food Additives", 1968, Published by the Chemical Rubber Co., Cleveland, Ohio, pp. 332, 333, 334.

*Primary Examiner*—James R. Hoffman
*Attorney, Agent, or Firm*—Edward T. McCabe; Charles E. Bouton; Jay C. Langston

[57] ABSTRACT

Butylated hydroxy anisole functions as an antimicrobial agent in hydrous material capable of supporting microbial growth when used in excess of about 0.02 percent by weight of the hydrous material.

8 Claims, No Drawings

RETARDATION OF OXIDATION AND MICROBIAL GROWTH IN FOODS

This invention relates to a method for the biological stabilization of hydrous material normally capable of supporting microbial growth. In accordance with the invention, the stabilization is obtained by the addition of at least 0.02%, by weight, of butylated hydroxy anisole to the hydrous material.

The quality of a hydrous food material can change because of a number of different factors. In some cases, the changes are oxidative in nature. Oftentimes the cause of oxidation is due to the presence of catalytic materials which accelerate the process. For example, in the case of fatty materials, the presence of small amounts of copper accelerates the development of "off-flavor". Oxidation occurs when the oxygen present unites with other chemical elements or groups of elements in foods to form oxides which cause the breakdown of fatty or other food components resulting in the ultimate deterioration of protein matter. The actions arising out of an accompanying oxidation are believed to cause various chemical changes resulting in such undesirable results as rancidification of fats. Basically, the undesirable effects of food oxidation appear to stem primarily from chemical changes.

Another cause of "off-condition" is the growth of bacteria and other microorganisms. Sometimes these are of a type that merely cause spoilage. However, some organisms are such that they produce health hazard problems. Generally speaking, all foods contan microscopic forms of parasitic plant and animal life called microorganisms which live on larger forms of life. Among the common microorganisms in food, usefl to man and animals, are bacteria, molds and yeast. Not all such microorganisms, however, are necessarily harmful or undesirable. For example, lactic acid bacteria are usefully employed in making sauerkraut from fresh cabbage and silage from fresh grass. In most foods, however, the excess growth of yeast, bacteria or mold indicates and accompanies spoilage.

It is therefore an object of this invention to stabilize hydrous material normally capable of supporting microbial growth.

Other objects and advantages not specifically set forth herein will be readily apparent to those skilled in the art upon a reading of the detailed description of the invention which follows.

Recently, work has been done in which it has been shown that some materials are capable of simultaneously minimizing several of the factors which cause "off-conditon" product. It is commonly known that materials such as butylated hydroxy anisole and butlated hydroxy toluene are effective agents in minimizing off-flavor development either through delaying the onset of oxidative rancidity or slowing down the development of off-flavors caused by the oxidation of phospholipid materials. It has now been found that butylated hydroxy anisole has another unique property previously unknown which produces a highly desirable anti-bacteriological effect. Butylated hydroxy anisole in amounts of .02% up to about .05%, by weight, will slow down the growth of microorganisms. Of course, amounts in excess of 0.05% also possess antimicrobial activity, but it has been found that 0.05% is an adequate amount to stabilize most hydrous, animal protein materials which are capable of supporting microbial growth Butylated hydroxy anisole is well recognized as having a low level of toxicity and is permitted by the Food and Drug Administration and the Meat Inspection Service in many foods. Examples include salad dressing, margarine, domestic sausage, fresh sausage, dry sausage, cooked meat patties, packaging material, confectionery, etc.

In the experimental work conducted, the level of usage is found to be extremely important. For example, at a level of 0.005% of butylated hydroxy anisole, little or no antimicrobial effect exists. If this is doubled to, say, 0.01% (the upper limit usually used when butylated hydroxy anisole is used as an anti-oxidant), the bacteristatic effect is only borderline. If, however, the level of butylated hydroxy anisole is raised to 0.02% or higher, then the bacteristatic effect is quite pronounced.

We have now found that butylated hydroxy anisole possesses broad spectrum activities. Not only is it able to control the growth of normal spoilage organisms in food products, but it is also capable of preventing the growth of a variety of pathogenic bacteria such as *Staphylococcus aureus*, *Salmonella typhimurim*, *Escherichia coli*.

One method of reducing food - borne illness comprises treating a food product with an aqueous solution of the butylated hydroxy anisole. For example, a solution of 3%, by weight of butylated hydroxy anisole 10% by weight of propylene glycol and 87%, by weight, if water may be applied to the surface by dipping, spraying, atomizing, etc. Processed meat items readily render themselves to this process.

BACTERIOLOGICAL PROPERTIES OF ANTIOXIDANTS
Butylated hydroxy anisole (BHA)
Butylated hydroxy toluene (BHT)

Two tests were conducted to determine whether or not the normal spoilage flora of vacuum packaged franks is inhibited in the presence of 2.5% NaCl and 0.01, 0.02, 0.05% BHA or BHT. The bacteria were extracted from the juice and meat of a swollen package of franks, diluted $10^{-3} - 10^{-8}$ and plated (pour plates) in triplicate for each dilution in Test I on SPC agar containing:

| | | | |
|---|---|---|---|
| 1. | .05% | BHA | 2.5% NaCl |
| 2. | .02% | BHA | " |
| 3. | .01% | BHA | " |
| 4. | .05% | BHT | " |
| 5. | .02% | BHT | " |
| 6. | .01% | BHT | " |
| control | — | | " | in Test II on APT containing:

| | | | |
|---|---|---|---|
| 1. | .05% | BHA | 2.5% NaCl |
| 2. | .02% | BHA | " |
| 3. | .01% | BHA | " |
| control | — | | " |

Plates were incubated at 20°C in test I for 5 days, in test II for 4 days.

| | | | Aerobic Plate Count | |
|---|---|---|---|---|
| | | | Test I | Test II |
| 1. | .05% | BHA | <1000 | <1000 |

-continued

|  |  |  | Aerobic Plate Count | |
|---|---|---|---|---|
| 2. | .02% | " | <1000 | 41 × 10$^7$ |
| 3. | .01% | " | 3 × 10$^8$ | 23 × 10$^8$ |
| 4. | .05% | BHT | 33 × 10$^8$ | not tested |
| 5. | .02% | " | 39 × 10$^8$ | " |
| 6. | .01% | " | 36 × 10$^8$ | " |
| Control |  |  | 39 × 10$^8$ | 28 × 10$^8$ |

The results shown above, suggest, that BHA in concentration of 0.05% is bactericidal, the concentration of .02% was apparently borderline, and 0.01% had little or no effect.

Results indicate BHT had no effect on the spoilage flora at the levels tested.

EXAMPLE - GLUE

A 30% aqueous colloidal suspension of bone glue was prepared containing varying levels of BHA (W/W). The samples were prepared without concern for microbial contamination (i.e, nonsterile containers, water, and glue were used). The samples were stored at room temperature and examined for bacterial and mold growth. The results are in the following table:

| BHA Level (W/W) | Mold Inhibition | Bacterial Inhibition |
|---|---|---|
| .001% | − | + |
| .01 | − | + |
| .05 | ++ | ++ |
| .1 | ++ | ++ |
| Control | − | − |

−, No inhibition; +, Inhibition after 4 days; ++, Inhibition after 14 days.

Obviously many modifications and variations of the invention as hereinbefore set forth may be made without departing from the spirit and scope thereof and therefore, only those limitations should be imposed as are indicated in the appended claims.

We claim:
1. A method for the biological stabilization of hydrous protein food material capable of supporting microbial growth, by inhibiting the development of microorganisms, by adding to said hydrous material a bacteriostatic agent consisting essentially of butylated hydroxy anisole in excess of about .02 percent by weight of the hydrous material.

2. The method of claim 1 wherein the hydrous material is an animal protein product.

3. The method of claim 1 wherein the hydrous material is a process meat item and the butylated hydroxy anisole is present in excess of 0.02 percent to about 0.05 percent.

4. A food composition containing sufficient water to support microbial growth and having distributed therethrough a bacteriostatic agent consisting essentialy of butylated hydroxy anisole in an amount in excess of about 0.02 percent by weight based on the total weight of the food composition.

5. The composition of claim 4 wherein the food composition is a meat item.

6. As a new article of manufacture, a manufactured hydrous food composition normally subject to microbial attack and resistant to autoxidation, having incorporated therein an antimicrobial agent consisting essentially of butylated hydroxy anisole in an amount in excess of about .02 percent by weight of the composition.

7. A method of preventing pathogenic contamination of a hydrous food product comprising treating said food product with a solution of butylated hydroxy anisole such that the final product consists of said hydrous food and butylated hydroxy anisole in excess of about .02 percent by weight of the food product.

8. The method of claim 7 wherein the hydrous food product is franks and the treatment comprises dipping the franks in the butylated hydroxy anisole solution.

* * * * *